United States Patent
Jia et al.

(10) Patent No.: US 8,466,836 B2
(45) Date of Patent: Jun. 18, 2013

(54) FAST FOURIER TRANSFORM WITH DOWN SAMPLING BASED NAVIGATIONAL SATELLITE SIGNAL TRACKING

(75) Inventors: Zhike Jia, San Jose, CA (US); Chi-Shin Wang, Half Moon Bay, CA (US)

(73) Assignee: CSR Technology Holdings Inc., San Jose, CA (US)

( * ) Notice: Subject to any disclaimer, the term of this patent is extended or adjusted under 35 U.S.C. 154(b) by 1473 days.

(21) Appl. No.: 11/218,298

(22) Filed: Aug. 31, 2005

(65) Prior Publication Data
US 2007/0046536 A1    Mar. 1, 2007

(51) Int. Cl.
G01S 19/24    (2010.01)
G01S 19/35    (2010.01)

(52) U.S. Cl.
CPC . *G01S 19/24* (2013.01); *G01S 19/35* (2013.01)
USPC .................. 342/357.63; 342/357.75; 375/150

(58) Field of Classification Search
CPC .................................. G01S 19/24; G01S 19/35
USPC ............. 342/357.01–357.17, 357.63, 357.75; 329/304; 375/347, 306, 148–150
See application file for complete search history.

(56) References Cited

U.S. PATENT DOCUMENTS

| | | | | |
|---|---|---|---|---|
| 4,028,626 A | * | 6/1977 | Motley et al. .................. | 375/235 |
| 4,426,712 A | * | 1/1984 | Gorski-Popiel ............... | 375/343 |
| 4,485,477 A | * | 11/1984 | Nossen .......................... | 375/150 |
| 4,829,543 A | * | 5/1989 | Borth et al. ................... | 375/329 |
| 4,894,842 A | * | 1/1990 | Broekhoven et al. ......... | 375/150 |
| 5,185,761 A | * | 2/1993 | Kawasaki ...................... | 375/130 |
| 5,210,770 A | * | 5/1993 | Rice .............................. | 375/142 |
| 5,253,268 A | * | 10/1993 | Omura et al. ................. | 375/150 |
| 5,271,034 A | * | 12/1993 | Abaunza ....................... | 375/150 |
| 5,291,081 A | * | 3/1994 | Takeuchi et al. ................ | 327/47 |
| 5,563,914 A | * | 10/1996 | Sogabe ......................... | 375/326 |
| 5,884,214 A | | 3/1999 | Krasner ........................ | 701/207 |
| 6,028,887 A | * | 2/2000 | Harrison et al. .............. | 375/147 |
| 6,108,317 A | * | 8/2000 | Jones et al. ................... | 370/320 |

(Continued)

FOREIGN PATENT DOCUMENTS

WO    02/23327    3/2002

OTHER PUBLICATIONS

Daffara, et al., "Improved Search Algorithm for Fast Acquisition in a DSP-based GPS Receiver", Signals, systems and Electronics, Aug. 1998, as published in IEEE, pp. 310-314.
Search Report issued Sep. 17, 2010 in EP 0681403.1.

*Primary Examiner* — Gregory C Issing
*Assistant Examiner* — Nga X Nguyen
(74) *Attorney, Agent, or Firm* — Pillsbury Winthrop Shaw Pittman LLP (57) ABSTRACT

A method and device to track navigational satellite signals, are claimed. In this invention, a combination of down-sampling and frequency domain transformation are used to track the navigational satellite signals under dynamic environment. A Fast Fourier Transform (FFT) with long coherent integration has been employed to determine the varying frequency components with high resolution. By representing a number of correlation values with their average value, it is possible to represent a long sequence of input values by a smaller number of values and a relatively short length FFT can reveal the low frequency components that are present in the signal during tracking operation. A large reduction in the computational load may be achieved using this down-sampling method without compromising on the frequency resolution.

26 Claims, 5 Drawing Sheets

U.S. PATENT DOCUMENTS

| | | | |
|---|---|---|---|
| 6,151,353 A * | 11/2000 | Harrison et al. | 375/136 |
| 6,169,514 B1 | 1/2001 | Sullivan | |
| 6,239,743 B1 * | 5/2001 | Lennen | 342/357.12 |
| 6,304,619 B1 * | 10/2001 | Citta et al. | 375/343 |
| 6,304,620 B1 * | 10/2001 | Rouphael | 375/344 |
| 6,392,590 B1 * | 5/2002 | Kagemoto | 342/357.06 |
| 6,407,699 B1 * | 6/2002 | Yang | 342/357.12 |
| 6,611,756 B1 | 8/2003 | Chen et al. | 701/213 |
| 6,674,401 B2 | 1/2004 | McBurney et al. | 342/357.12 |
| 6,738,015 B1 | 5/2004 | Linhart et al. | 342/357.15 |
| 6,868,110 B2 | 3/2005 | Phelts et al. | 375/144 |
| 6,879,913 B1 | 4/2005 | Yu | 701/214 |
| 7,136,443 B2 * | 11/2006 | Vallet et al. | 375/371 |
| 7,142,589 B2 * | 11/2006 | Valio | 375/150 |
| 7,388,541 B1 * | 6/2008 | Yang | 342/464 |
| 2002/0069016 A1 | 6/2002 | Lin et al. | |
| 2004/0071200 A1 * | 4/2004 | Betz et al. | 375/152 |
| 2004/0098558 A1 | 5/2004 | Warloe et al. | |
| 2004/0196895 A1 * | 10/2004 | Akopian | 375/150 |
| 2005/0008106 A1 * | 1/2005 | Dong-Sik | 375/342 |

* cited by examiner

FAST FOURIER TRANSFORM WITH DOWN SAMPLING BASED NAVIGATIONAL SATELLITE SIGNAL TRACKING

FIELD OF THE INVENTION

The present invention relates generally to navigational signal receivers. More specifically, it relates to techniques for efficient tracking of acquired signals from navigational system satellites.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. More than twenty-four satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from sufficient number of satellites, a GPS receiver can calculate its position, velocity, altitude, and time.

The GPS receivers can operate in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on to those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PN code phase. Each satellite transmits a unique PN code, which repeats every millisecond. The receiver locally generates a replica frequency and a replica code phase and correlates these with the received satellite signals. The PN code has to be searched in at least 2046 phases and the frequency search depends upon the Doppler frequency due to relative motion between the satellite and the receiver. Additional frequency variation may result due to local oscillator instability.

When the satellite signal is strong the receiver can detect the presence of a satellite signal in a short time. But when the signal is weak a long signal correlation is needed and the integration or correlation needs to be coherent which requires large computation load. Signals may be weak due to an obstruction by foliage or buildings, or indoor operation. Special techniques are required to acquire the signal under these weak signal power conditions. One of the more widely used techniques under these conditions is known as assisted GPS (AGPS). A method of AGPS has been disclosed in U.S. Pat. No. 5,884,214. This technique is mainly used with GPS receivers in cell phones. In this method a cellular base station or server provides the ephemeris, time and data bit edge position to the GPS receiver in the cell phone so that it may acquire the satellite signal. This technique requires synchronization with the base station or server, and the service has to be provided by the cell phone operator. Consequently, it results in extra subscription charges and base station augmentation.

Due to the disadvantages with AGPS, it is desirable to be able to acquire weak GPS signals without outside assistance. Examples of this approach are disclosed in U.S. Pat. Nos. 5,271,034, 6,392,590, and 6,611,756. Most of these techniques, however, are not suitable when the signal is extremely weak due to the large computation involved in carrying out lengthy integrations and fast Fourier transforms (FFTs). In these techniques, the integration involves the summing of one-millisecond correlation values. A correlation value is obtained by comparing the samples of input signal with locally available PN code samples over a one-millisecond interval. The difference between the agreement and disagreement of the sample values is this correlation value. In the case of perfect correlation and no noise, the correlation value is equal to the number of samples in the one millisecond length, e.g., if the number of samples per code-length in one millisecond is 2046, then the perfect correlation value is 2046. But if the codes are not aligned this value may be −130 or +126 or −2. Thus, in this case the detection of the received signal can be determined easily. In the presence of noise, however, the correlation value may not be 2046, but may have a lower value, and when the signal is extremely weak it may not be able to determine the correct correlation. In these circumstances, the receiver can estimate the correlation value over several consecutive milliseconds to arrive at a reasonable value. This summing up over several milliseconds is also known as coherent integration. The coherent integration requires that there are no sample reversals due to the residual carrier frequency. If there are reversals due to carrier frequency, the correlations may be carried out over non-reversed parts of the sample lengths and may be added by squaring each part. This is known as non-coherent integration. Compared to non-coherent integration, coherent integration provides better results for the same integration length. To boost the weak signal power, long time integration is necessary. However, as integration time increases, the requirement of low residual carrier frequency becomes stricter for coherent integration. Furthermore, in many cases the receiver processor may not be able to meet the computational demands of coherent integration over long time periods.

Once the satellite signal has been acquired, it is necessary to lock on to the signal by closely following the variations of the signal characteristics, which process is also known as tracking the signal. A receiver may fail to track an acquired signal due to reasons such as significant drop in the signal power, variation in the carrier frequency due to variety of reasons such as satellite Doppler, local oscillator instability, platform dynamics, etc. There are several patents on efficient tracking under weak signal and high dynamics conditions. For example, U.S. Pat. No. 6,879,913 uses a disciplined oscillator and Doppler estimation from orbital data for a carrier-less tracking scheme. On the other hand, U.S. Pat. No. 6,868,110 employs a method, which involves tracking error estimation and removing any bias in tracking. The method presented in U.S. Pat. No. 6,738,015 is based on pseudo-range error measurements. On the other hand, U.S. Pat. No. 6,674,401 employs a sample-averaging scheme to maintain a constant rate of sample input to the signal processor. None of these methods addresses both the dynamic as well as weak signal conditions during tracking.

Accordingly, there is a need in the art for a navigational satellite signal receiver to be able to track the acquired signals under weak and/or dynamic signal conditions.

SUMMARY OF THE INVENTION

In one aspect of the invention, a method is provided for navigational satellite signal tracking under adverse signal conditions. During tracking, in order to keep the local frequency close enough to the variation of received signal, high frequency resolution may be provided by FFT of a sequence of correlation values of long time duration. A sequence having a smaller number of values spread over the same time interval may be obtained by averaging and down-sampling the sequence of correlation values. For example, several consecutive values may be grouped into one group, and the values in the group may then be replaced by a single value for the group. Thus, a large number of values may be replaced by a smaller number of values over the same given duration. By computing an FFT of the resulting down-sampled sequence, the frequency components may be determined with high frequency resolution but with reduced computational demand. The frequency component with maximum power may be used to identify the actual carrier frequency to track. By choosing a suitable length of FFT and down-sampling ratio, any platform dynamics may be adaptively handled.

DETAILED DESCRIPTION

Figure 1:
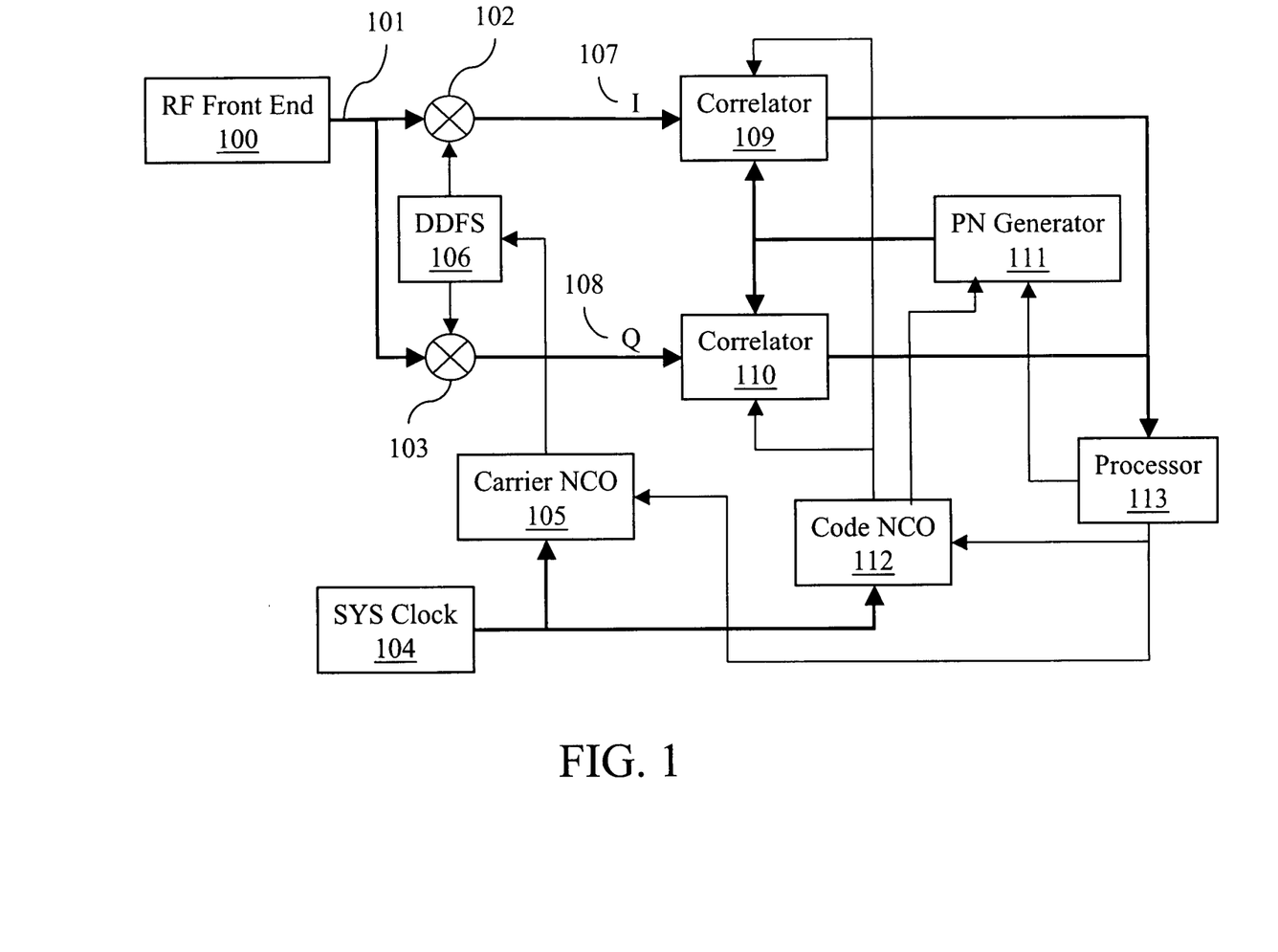
FIG. 1 is a block diagram illustrating a GPS receiver according to an embodiment of the present invention.

A preferred embodiment of a receiver according to the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase (I) component 107. In a parallel path the same signal 101 is multiplied by the DDFS frequency in quadrature (i.e., with a phase shift of 90 degrees) to produce quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PN sequence generated by a PN generator 111. The PN-sequence corresponds to the channel being processed by the baseband section at that time. The PN sequence generator is driven by code NCO 112. The local code generator frequency is made equal to the code rate of I and Q paths by corrective feedback from processor 113 to the code NCO 112. In addition, processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113, as will be described in detail below. Additional details of the receiver baseband section described above are contained in U.S. patent application Ser. No. 11/123,861 filed May 6, 2005, which is incorporated herein by reference.

The DSP core 113 receives one millisecond integrated (correlated) I and Q values from the GPS baseband section described above. In order to acquire a GPS signal in the DSP processor, all dwells (carrier frequency, code offset) are searched. It is a two-dimensional search. Coherent integration and non-coherent integration are two commonly used integration methods to acquire GPS signals. Coherent integration provides better signal gain at the cost of larger computational load, for equal integration times.

The power associated with non-coherent integration with one millisecond coherent integration is $$\text{Power} = \sum_{n=0}^{N-1} (I(n)^2 + Q(n)^2) \quad (1)$$

and the power associated with coherent integration is $$\text{Power} = \left(\sum_{n=0}^{N-1} I(n)\right)^2 + \left(\sum_{n=0}^{N-1} Q(n)\right)^2 \quad (2)$$

where I(n) and Q(n) denote the one-millisecond integration values from the baseband section at interval n, and N denotes the desired number of one-millisecond integration intervals. For coherent integration, the valid frequency bandwidth is narrowed so the frequency step is smaller than in non-coherent integration, which means that there are more frequency bins to search when using coherent integration. One method to mitigate this impact is to use an FFT method for coherent integration so that more frequency bins can be checked at a time. However, one additional parameter (i.e., bit edge) needs to be detected, especially for coherent integration over extended periods of time. Thus, when used as it is, this FFT based method results in increased computational load. A multi-step acquisition scheme consisting of coarse acquisition and fine acquisition may be employed to reduce the computational load.

Once the signal has been acquired, it is tracked using the local replica signal. Ideally, the local signal should closely follow the frequency variations in the incoming signal, which is particularly important when high dynamic GPS platforms are involved. At times the frequency deviation may be high while at other times this deviation may be small. A coverage of modest frequency range but still smaller than the large range required in signal acquisition is sufficient. To closely follow frequency variations, however, a high resolution estimation of the frequency components is desired. The FFT process can generate high resolution frequency components by processing a sequence of correlation values extending over a longer time interval. Unfortunately, the number of values within this long time interval may be large, and computing an FFT of a large number of values requires greater computational load and time. However, using techniques of the present invention, the number of values within this larger time interval can be reduced, thereby reducing also the FFT length and hence the associated computational load and time. One technique for reducing the number of values in the sequence is replacing a group of consecutive values by the average of the values in the group. Alternatively, instead of the average value, the sum of the group may be used. Many other techniques of representing the group of values may also be considered. These methods may include, for example, representing the group by its root mean square (RMS) value when signs of the group values are the same, or by decimating the sequence of values. The averaging or summing technique is preferred in most cases since it is simple and accurate as all values with different signs are considered. It is to be noted that the values here are the result of the one-millisecond correlations of the input signal with the local replica.

Figure 2A:
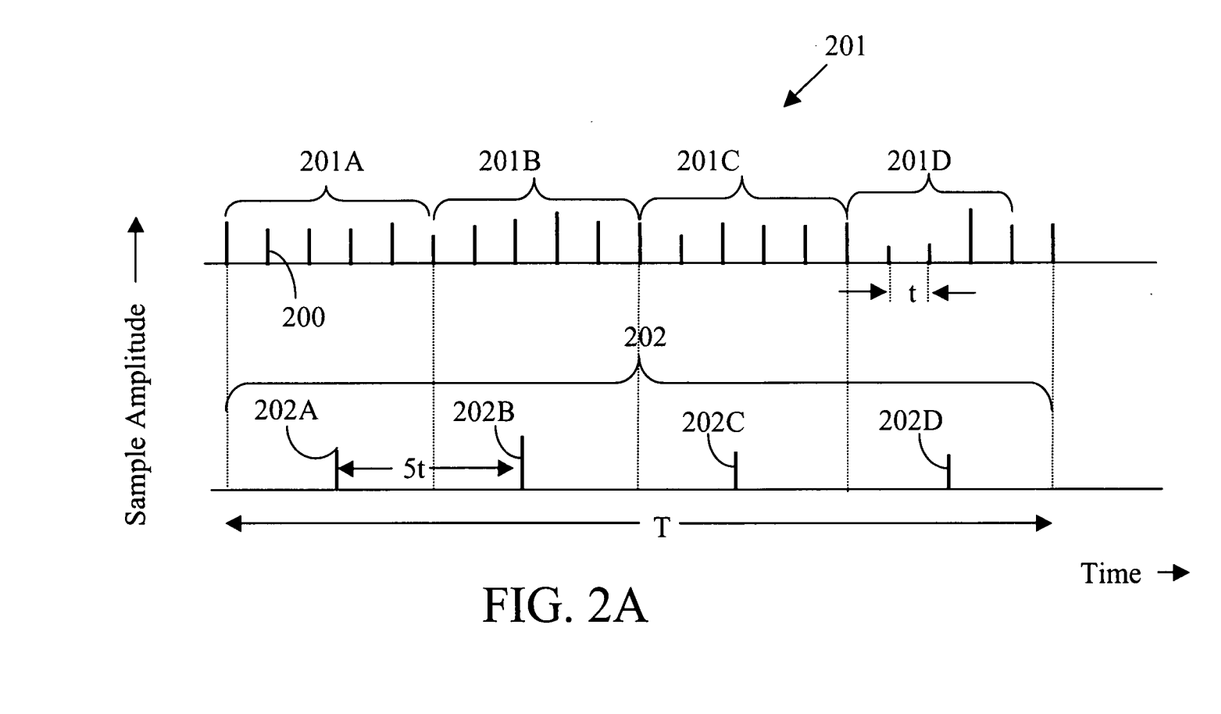
FIG. 2A is an illustration of the down-sampling in time domain.

A technique for down-converting a sequence of values in time domain is shown in FIG. 2A. An original stream of twenty correlation values 201 spanning a total duration T is divided into four groups 201A, 201B, 201C, 201D, with five consecutive values in each group, e.g., value 200 is the second of five values in group 201A. Adjacent values are separated by a uniform time interval t, which is one millisecond in the present case. A down-converted sequence 202 is derived from the original sequence 201 by replacing each group of values by a representative value. In this example, the four groups 201A-D are replaced by four corresponding values 202A-D. The value 202A, for example, may be computed by taking the average of the five consecutive values in group 201A. Thus the number of values is reduced by the ratio of 5:1 and the time interval between these down-converted values in sequence 202 is 5:1. But the total time duration T of the original sequence 201 is the same as the total time duration T of the down-converted sequence 202. The number of values in each group (i.e., the down-conversion factor) may be any integer value.

Figure 2B:
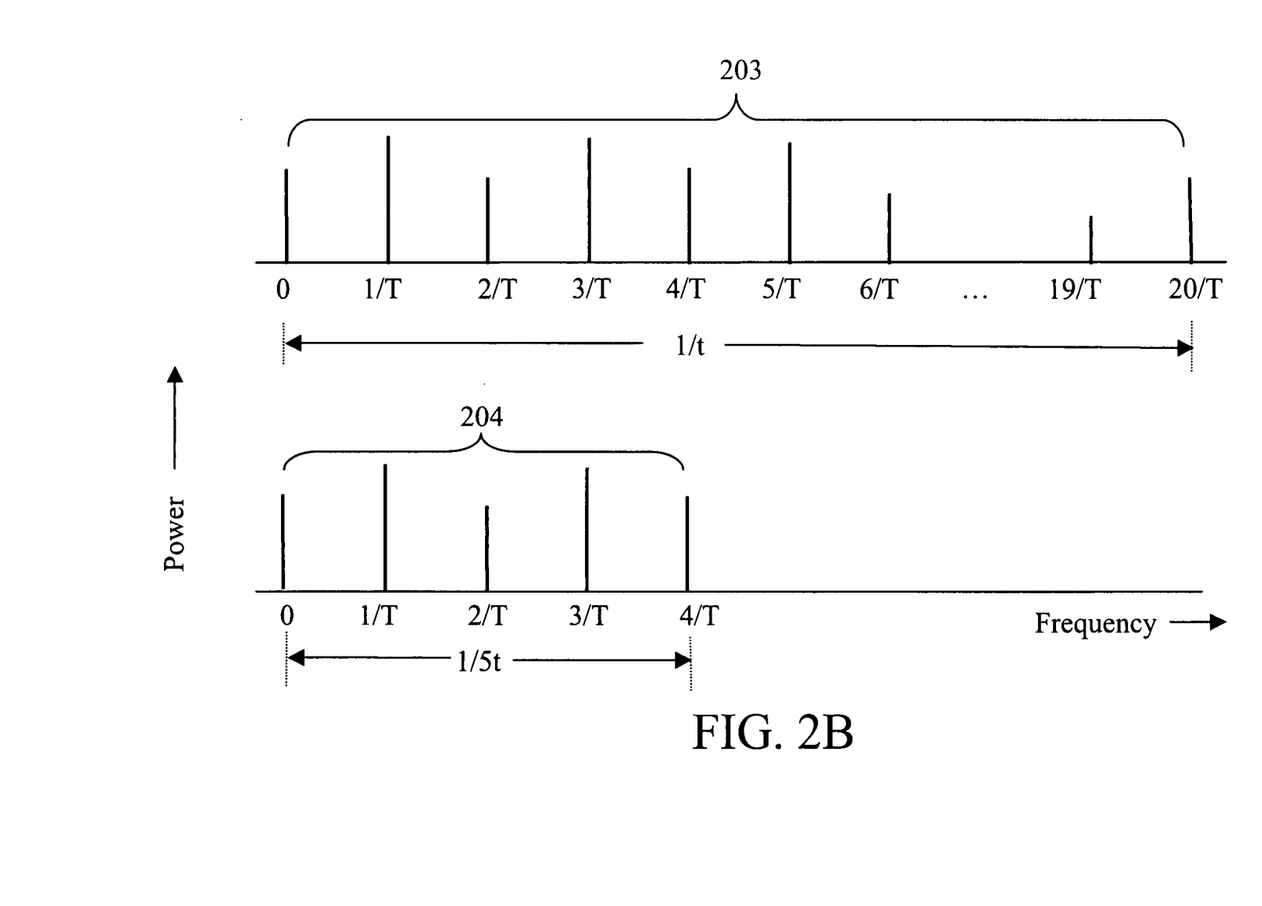
FIG. 2B is an illustration of frequency transformations of original sequence and the one after down sampling.

FIG. 2B shows the frequency transforms of the original sequence and corresponding down-sampled sequence. In particular, the frequency-domain sequence 203 is the FFT of original time-domain sequence 201 while the frequency-domain sequence 204 is the FFT of the corresponding down-converted sequence 202. From the sequences 203 and 204, it is clear that, although the lengths of these two frequency domain sequences differ, their frequency resolutions are both 1/T. Although the frequency domain sequence 204 has fewer correlation values than sequence 203, the high frequency components, which are missing in sequence 204, are not required for signal tracking because they are out of range of the frequency dynamics in the tracking stage. When the variation in the GPS platform dynamics is high, i.e., when the frequency changes over a large range, many frequency bins need to be considered. On the other hand, when the platform dynamics is small, the frequency variation is also small and so a large integration length or a higher number of values are required in order to obtain a high frequency resolution.

In the case of GPS tracking, the one-millisecond correlation values from the baseband section of the receiver serve as the values in the original sequence. Once the signal has been acquired, the receiver enters tracking mode. During tracking, the carrier frequency will fluctuate within a relatively narrow range compared with the range during acquisition stage. Group size is inversely proportional to the tolerable frequency range. The maximum tolerable frequency variation corresponds to the group size of 1, that is, without down sampling. When the group size is 1, the maximum tolerable frequency variation range is 1000 Hz, which is determined by the original sampling rate of 1000 Hz. If the required frequency variation range is $\Delta f$, the group size can be any integer no more than $1000/\Delta f$. For example, if the frequency dynamic range is 200 Hz, the group size can be 5 or less. A smaller group size corresponds to a smaller down-sampling ratio and will generate a larger number of frequency components. A larger grouping, on the other hand, will produce fewer frequency components, which is suitable for slow frequency variations. Thus, if the user platform dynamics are high, the group size is preferably small.

Figure 3:
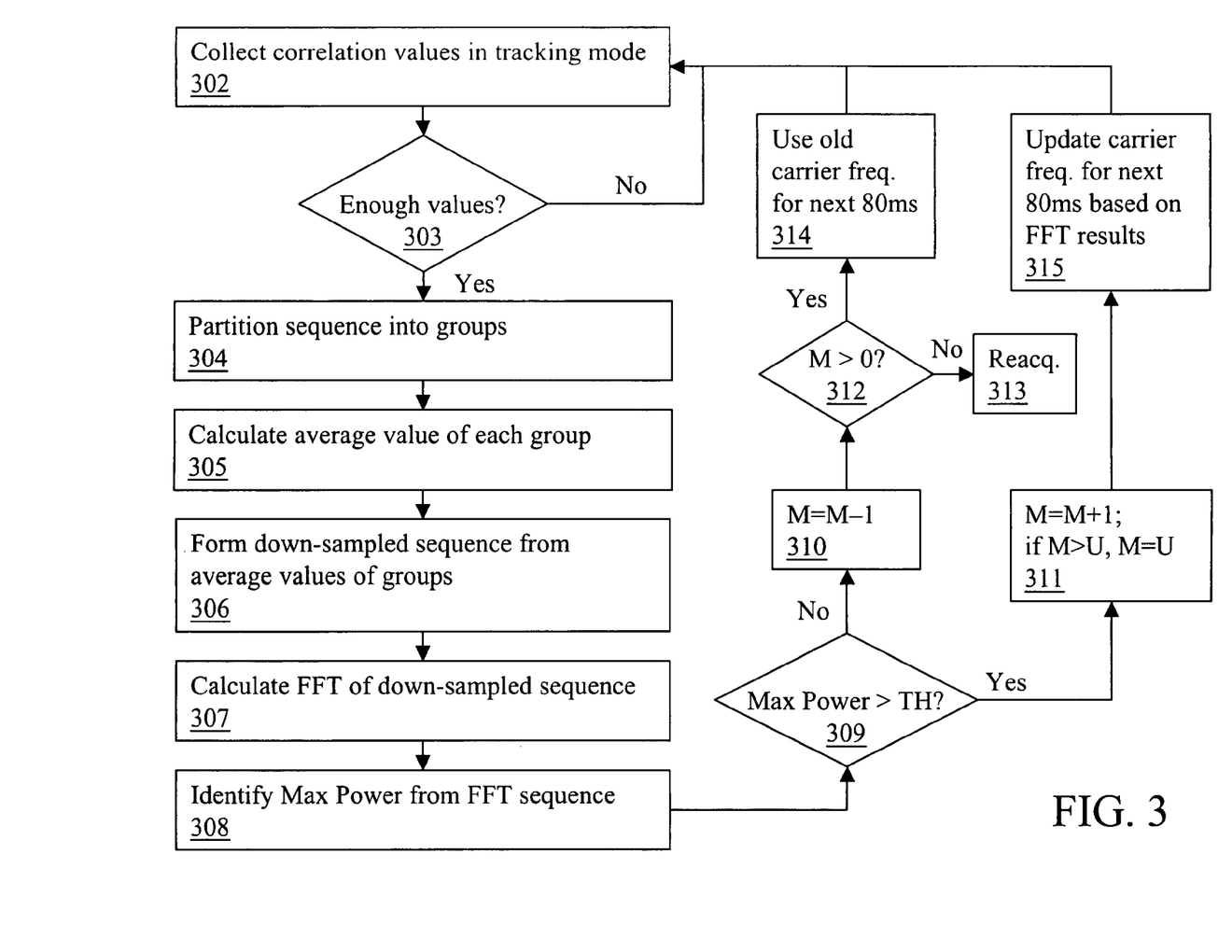
FIG. 3 is the flowchart of the tracking process using FFT and down-sampling.

The flowchart in the FIG. 3 illustrates one embodiment of the tracking operation with down-sampling and FFT. The one-millisecond correlation values are collected from the hardware as shown in step 302. At decision block 303 the process checks if a sufficient number of values have been collected yet. After collecting enough values, which is 80 in this embodiment, consecutive values are partitioned into groups as in step 304. The L1 signal of GPS is modulated with a 50 bit/second data stream by bi-phase shift key (BPSK) modulation. The 1 and 0 bit values are represented by carrier phase shifts of 0 and 180 degrees, respectively. The time duration of one data bit is 20 ms, i.e., 20 consecutive correlation values. So a sign change of the values of a group might occur when that particular group has a bit edge within, it. Because of this sign change, the group partition is aligned with the data bit edge so that there is no sign transition between values in one group if the group size is less than 20. In one embodiment, there are sixteen groups with five values per group, and the down sampling ratio is five (For ease of illustration, FIGS. 2A and 2B show the case of just four groups). In each group, the average value of its five values is computed as in step 305. In step 306 the original sequence of values is replaced by the average values to produce a down-sampled sequence. Each average value may be placed at the temporal midpoint of its corresponding group of values. In this embodiment there will be a sequence of sixteen average values with a five-millisecond time interval between adjacent values. The sequence will have a total time duration of 80 milliseconds. The values of the down-sampled sequence may be denoted by $\{s_0, s_1, \ldots, s_{15}\}$ where $s_i = I_i + j^*Q_i$, where $0 \leq i < 16$, $I_i$ is the average value of in-phase correlation values in the $i^{th}$ group and $Q_i$ is the average value of quadrature correlation values in the $i^{th}$ group, and j is a unit of the imaginary part.

Figure 4:
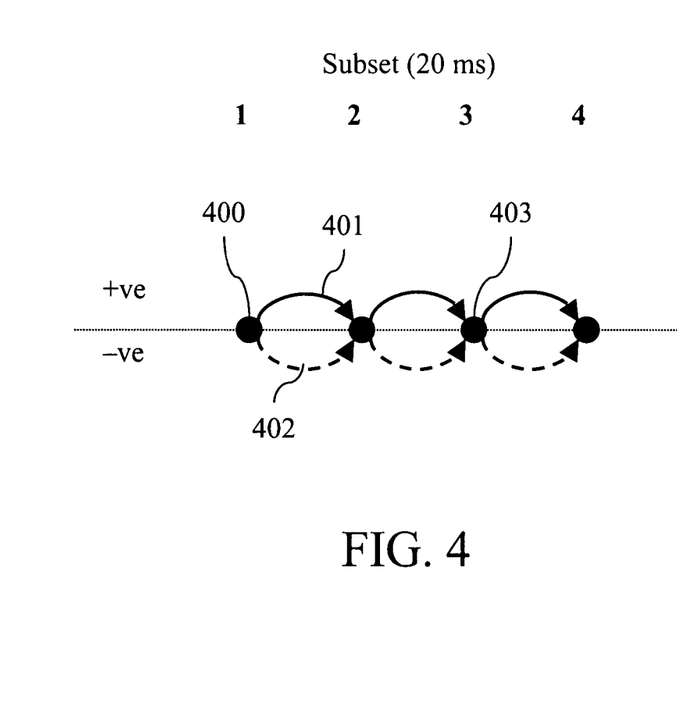
FIG. 4 illustrates the sign changes between adjacent subsets

A 16-point complex FFT of these sixteen values are then computed in step 307 to produce a sequence of frequency components. Because of the presence of the data modulation, the FFT cannot be computed directly due to possible bit sign changes between values. If the data bit polarity is already known, the same can be removed by multiplying the value with 1 (positive polarity) or −1 (negative polarity) and then compute FFT. However, in most cases, there is no prior knowledge of the data bit polarity. One solution to this problem is to use a maximum likelihood criterion based algorithm, as shown in FIG. 4. The 16 values in the down-sampled sequence are divided into 4 subsets. Each subset contains four values, each of which is within the same data bit duration of 20 milliseconds. The sign change may occur between two adjacent subsets. In FIG. 4, the dots, such as 400 and 403 represent subsets within the same data bit duration, and arrow represents relative polarity of present data bit with respect to that of the first data bit. The polarity of the first data bit is assumed to be positive. Thus, the arrow 401 represents the second data bit covering second subset has the same polarity as that of the first subset while arrow 402 represents the second data bit covering second subset has the opposite polarity with respect to the first subset. The actual absolute data bit polarity is not determined here because of the uncertainty of the polarity of the first data bit. Instead, polarity changes with respect to the first data bit are estimated. (The actual absolute polarity is determined later by a separate process, which is not in the module of signal tracking). Both possible relative polarities are checked using a maximum likelihood criterion and by considering all of its prior subsets whose relative polarities with respect to the first data bit are known. Thus the number of prior subsets considered may vary from one (in Step 2, below) to three (in Step 4, below) as this is only to remove data modulation over the length of integration. The frequency components of the combined prior subsets are computed. Then the frequency components of the present subset are also computed. These two frequency sets are added and subtracted, and the result, which has a higher value, determines the polarity, i.e., the polarity that results in higher power is selected while the other with lower power is rejected. The procedure is as follows:

Step 1: Compute the FFT of the first subset.

The input time-domain sequence of the first subset is $\{s_k\}=\{s_0, s_1, s_2, s_3, 0, 0, \ldots, 0\}$. After 16-point complex fast Fourier transform, the output sequence in frequency domain can be denoted as $\{S_k\}=\{S_0, S_1, \ldots, S_{15}\}$.

Step 2: Compute the FFT of the second subset, and update the sequence in frequency domain accordingly.

The input sequence of the second subset is $\{0, 0, 0, 0, s_4, s_5, s_6, s_7, 0, 0, \ldots, 0\}$. After 16-point complex fast Fourier transform, the interim output sequence in frequency domain can be denoted as $\{SM_0, SM_1, \ldots, SM_{15}\}$. The output sequence can be updated as follows.

$$S_k = \begin{cases} S_k + SM_k & \text{when Power}(S_k + SM_k) > \text{Power}(S_k - SM_k) \\ S_k - SM_k & \text{otherwise} \end{cases} \quad (3)$$

Here "+" corresponds to the same polarity as the first data bit, shown as arrow 401 while "−" corresponds to the opposite polarity to the first data bit, shown as arrow 402. The function Power(•) is defined as the summation of the squares of real part and imaginary part of the complex value.

Step 3: Compute the FFT of the third subset and update the sequence in frequency domain accordingly.

Step 4: Compute the FFT of the fourth subset and update the output sequence in frequency domain accordingly.

After the above four steps, we get the final result of the FFT. The sequence in frequency domain is denoted as $\{S_0, S_1, \ldots, S_{15}\}$, where $S_k$ is a complex number having real part Real($S_k$) and imaginary part Img($S_k$). In Step 308, the power of the $k^{th}$ frequency bin can be calculated as $P_k$=Power $(S_k)$=Real$(S_k)^2$+Img$(S_k)^2$, generating a power sequence $\{P_0, P_1, \ldots, P_{15}\}$. The largest power value in this set is denoted $P_m$ where m is an index of the corresponding frequency bin.

As shown in step 309, the peak power is compared with a predetermined tracking threshold. The tracking threshold is based on the noise power. In this embodiment, the value of tracking threshold is preferably three times the noise power. If the peak power is greater than the tracking threshold, the corresponding carrier frequency is updated as follows.

$$f_{error} = \begin{cases} m\frac{1000}{5 \times 16} & \text{for } m = 0, 1, \ldots 7 \\ (m-16)\frac{1000}{5 \times 16} & \text{for } m = 8, 9, \ldots 15 \end{cases} \quad (4)$$

$$f_{n+1} = f_n + f_{error} \quad (5)$$

Where $f_{error}$ is the average frequency error of current 80 ms, $f_n$ is the carrier frequency of the local replica signal used in the current 80 ms, and $f_{n+1}$ is the carrier frequency of the local replica signal to be used with the next 80 ms. At the same time, a tracking count M is increased by one until M reaches its upper limit U, as shown in step 311.

But if, on the other hand, the peak power is less than the tracking threshold at decision block 309, the tracking count M is decreased by one until it reaches zero, as in step 310. If the resulting value of M is greater than zero, the tracking process is continued at step 302 with a new set of correlation values. However, the carrier frequency is not updated as shown in block 314 because there is no real signal tracked in the last 80 ms. If M is zero, the receiver is not considered to be tracking the signal and a reacquisition of the signal is performed in step 313.

The value of tracking count upper limit U in block 311 is determined by the tracking hold time. In this embodiment the tracking hold time is set to be two seconds. The value of U in this embodiment is the largest integer less than 2/0.08 (i.e., 25), where 0.08 is the coherent integration time, 0.08 second or 80 ms, which is also the carrier frequency updating interval. Thus, if the peak power is less than the tracking threshold for 25 times consecutively, the tracking is considered to be lost. On the other hand, if the peak power is less than the tracking threshold occasionally, tracking continues but the carrier frequency is not necessarily updated. This is very useful in the condition of signal power variation, such as passing under overbridge, etc.

In most cases, the actual carrier frequency is not exactly the same as one of the 16 frequency lines. It might be between two adjacent frequency lines. Interpolation can be used to finetune the carrier frequency. This is an enhancement option to improve the performance of the FFT based tracking algorithm. As a trade off between computation cost and precision, a quadratic interpolation may be employed based on the frequency component with maximum power and its adjacent frequency components. Assuming the peak power to be $P_m$, where m (0°<m<16) is the corresponding frequency index. For the ease of processing, we change the index as follows.

$$k = \begin{cases} m & \text{when } m < \frac{16}{2} = 8 \\ m - 16 & \text{when } m \geq \frac{16}{2} = 8 \end{cases} \quad (6)$$

So the new frequency index to peak power is k where $-8°<k<8$.

The two adjacent powers (denoted $P_L$ and $P_R$) to the peak power $P_k$ are defined according to the following table.

TABLE 1

| | Peak Power and Its Adjacent Powers | | |
|---|---|---|---|
| k | $P_L$ | Peak Power | $P_R$ |
| $-7° < k° < 6$ | $P_{k-1}$ | $P_k$ | $P_{k+1}$ |
| $-8$ | $P_7$ | $P_{-8}$ | $P_{-7}$ |
| $7$ | $P_6$ | $P_7$ | $P_{-8}$ |

The value of power is calculated as in block 308 of FIG. 3. The value of $f_{error}$, may be calculated from $$f_{error} = \left( \frac{P_R - P_L}{2(2P_k - P_R - P_L)} + k \right) \cdot \frac{1000}{5 \times 16} \quad (7)$$

The carrier frequency can then be updated for the next 80 ms according to Eq. 5.

As is common in signal tracking, a frequency lock loop (FLL) is preferably used. As another enhancement option, a FLL can also be combined with the method described above. The frequency error, which is the input signal to FLL, can be obtained by Eq. 4 or Eq. 7. That is, no additional frequency discriminators are needed. Because the frequency error obtained through FFT analysis is much more precise than that obtained from normal frequency discriminators, the lock time of FLL can be shortened greatly. The details of FLL for GPS receivers are available in Chapter 5 of the book "Understanding GPS: Principles and Applications" by Elliot D. Kaplan (Editor), Artech House Publishers, Boston, 1996.

The above two options can be implemented together or separately.

The carrier frequency variation as described above may be erroneous due to noise and so a scaled down frequency variation is usually adopted. In this method, a smaller fixed frequency correction is applied when the computed frequency error is large.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

The invention claimed is:

1. A method for tracking received signals in a global satellite navigation receiver, the method comprising:
   collecting a sequence of correlation values derived from the received signals correlated with PN codes;
   partitioning the collected sequence into N groups of consecutive correlation values, where N is a positive integer;
   calculating from each of the N groups, a corresponding set of N values forming a downsampled sequence;
   converting the down-sampled sequence from time domain to frequency domain to produce a frequency domain sequence;
   identifying a maximum power value in the frequency domain sequence;
   calculating a frequency error between the received signals and a locally generated replica signal based on the identified maximum power value; and
   adjusting a local replica carrier frequency by an amount equal to the frequency error.

2. The method of claim 1, wherein calculating the corresponding set of N values comprises averaging the consecutive correlation values in each of the N groups.

3. The method of claim 1, wherein calculating the corresponding set of N values comprises taking the root mean square of the consecutive correlation values in each of the N groups.

4. The method of claim 1, further comprising varying the value of N according to platform dynamics.

5. The method of claim 1, wherein the N values in the down-sampled sequence are assigned to temporal midpoints of the N groups.

6. The method of claim 1, wherein collecting the sequence of correlation values comprises selecting a total number of values to collect as a function of the receiver dynamics.

7. The method of claim 1, wherein adjusting the local replica carrier frequency comprises reducing a rate of adjustment to avoid spontaneous burst-like changes in the local replica carrier frequency due to signal noise.

8. The method of claim 1, further comprising fine-tuning the frequency error by interpolation.

9. The method of claim 1, further comprising employing a Frequency Lock Loop (FLL) to further improve the tracking performance.

10. The method of claim 9, wherein the frequency error obtained by FFT analysis is used as an input residual frequency to the Frequency Lock Loop (FLL).

11. The method of claim 1, wherein partitioning the collected sequence comprises aligning transitions between the groups with data bit edge transitions.

12. The method of claim 1, comprising selecting a number of frequency bins as a function of receiver dynamics.

13. The method of claim 1, wherein converting the down-sampled sequence from time domain to frequency domain comprises using a maximum likelihood criterion based method to remove data modulation.

14. A global satellite navigation system receiver device comprising an RF front end for receiving signals from navigational satellites, a baseband section receiving IF signals from the RF front end, and a processor receiving I, Q correlation values from the baseband section, wherein the processor:
   collects a sequence of the correlation values derived from the received signals correlated with PN codes;
   partitions the collected sequence into N groups of consecutive correlation values, where N is a positive integer;
   calculates from each of the N groups, a corresponding set of N values forming a downsampled sequence;
   converts the down-sampled sequence from time domain to frequency domain to produce a frequency domain sequence;
   identifies a maximum power value in the frequency domain sequence;
   calculates a frequency error between the received signal and a locally generated signal based on the identified maximum power value; and
   adjusts a local replica carrier frequency by an amount equal to the frequency error.

15. The device of claim 14, wherein calculating the corresponding set of N values comprises averaging the consecutive correlation values in each of the N groups.

16. The device of claim 14, wherein calculating the corresponding set of N values comprises taking the root mean square of the consecutive correlation values in each of the N groups.

17. The device of claim 14, further comprising varying the value of N according to platform dynamics.

18. The device of claim 14, wherein the N values in the down-sampled sequence are assigned to temporal midpoints of the N groups.

19. The device of claim 14, wherein collecting the sequence of correlation values comprises selecting a total number of values to collect as a function of the receiver dynamics.

20. The device of claim 14, wherein adjusting the local replica carrier frequency comprises reducing a rate of adjustment to avoid spontaneous burst-like changes in the local replica carrier frequency due to signal noise.

21. The device of claim 14, further comprising fine-tuning the frequency error by interpolation.

22. The device of claim 14, further comprising employing a Frequency Lock Loop (FLL) to further improve the tracking performance.

23. The device of claim 22, wherein the frequency error obtained by FFT analysis is used as an input residual frequency to the Frequency Lock Loop (FLL).

24. The device of claim 14, wherein partitioning the collected sequence comprises aligning transitions between the groups with data bit edge transitions.

25. The device of claim 14, comprising selecting a number of frequency bins as a function of receiver dynamics.

26. The device of claim 14, wherein converting the down-sampled sequence from time domain to frequency domain comprises using a maximum likelihood criterion based method to remove data modulation.

* * * * *

UNITED STATES PATENT AND TRADEMARK OFFICE
CERTIFICATE OF CORRECTION

PATENT NO. : 8,466,836 B2  
APPLICATION NO. : 11/218298  
DATED : June 18, 2013  
INVENTOR(S) : Jia et al.

Page 1 of 1

It is certified that error appears in the above-identified patent and that said Letters Patent is hereby corrected as shown below:

In the Specification

In Column 5, Line 42, delete "5:1." and insert -- 5t. --, therefor.

In Column 6, Line 33, delete "within," and insert -- within --, therefor.

In the Claims

In Column 9, Line 58, in Claim 1, delete "codes:" and insert -- codes; --, therefor.

Signed and Sealed this  
First Day of October, 2013

Teresa Stanek Rea  
*Deputy Director of the United States Patent and Trademark Office*